Patented May 6, 1930

1,757,632

UNITED STATES PATENT OFFICE

EARDLEY HAZELL, OF NEW YORK, N. Y., ASSIGNOR TO THE NAUGATUCK CHEMICAL COMPANY, OF NAUGATUCK, CONNECTICUT, A CORPORATION OF CONNECTICUT

TREATMENT OF LATEX

No Drawing.   Application filed October 5, 1928.   Serial No. 310,676.

This invention relates to processes of modifying and improving the properties of latex and the rubber laid down from such latex, and to the product of such processes.

Among the salient objects of this invention are to increase the green "tack" of rubber laid down from latex, i. e. the adhesiveness of the unvulcanized rubber; to cause latex to cream; to increase the stability (mechanical) of latex; to preserve latex against putrefaction; to deodorize latex where bad odor is undesirable and which arises principally from putrefied latex; to increase the filterability (rate of deposition) of the latex. These objects may be attained simultaneously or one or more effects may be produced with the practical exclusion of the others, according to the method by which the process is carried out. The process may be modified to attain a further object of producing a glazed, non-tacky condition in the rubber laid down, instead of an increased tack as above set forth.

The invention may be applied to: (1) the preparation of rubber articles, the technique of which requires strong green tack before vulcanization and firm adhesion both before and after vulcanization. (2) Adhesive preparations. (3) Where a combination of such properties as rapid deposition, high consistency and stability is desirable, along with strong green tack or minimum tack, e. g. for spreading on fabrics. (4) The increased stability and preservation resulting from the process renders the latex particularly amenable to manipulation. (5) Making rubber articles by the method of deposition from and filtration of latex. (6) As a deodorant in cases where bad odor is undesirable, e. g. where the latex is used in the manufacture of articles coming in contact with foodstuffs.

The invention comprises broadly treating rubber latex with M-halogen-O wherein M is an organic radical such as ethyl, amyl, tertiary butyl, or alkali metal or alkali-earth metal, or hydrogen. Particularly the invention comprises treating rubber latex with a hypochlorite.

Previous inventions for producing tacky rubber from latex have depended upon the use of certain hydrophylic colloids, acidifying the latex, as by, e. g. $CH_2O$, stabilizing the latex in the absence of an alkaline preservative, as by using the reaction product of an aromatic hydrocarbon, aliphatic alcohol and concentrated sulphuric acid,—commonly known in the trade as Nekal—or by adding a material having a solvent and depolymerizing action on the rubber, e. g. pine tar. Applicant's invention has the advantages of low cost both with respect to materials and labor, relative simplicity, and rapidity, a number of desirable results are produced by a single treatment, and the process is readily amendable to control.

When rubber latex is treated with a material such as hypochlorite, the following changes in the latex, the rubber laid down from it, or in both, are produced, depending on the conditions prevailing.

1. It brings about a permanent tackiness, which is not destroyed by heat, or if weakened by moisture, returns on drying. The tackiness produced is approximately proportional to the quantity of reacting substance used, other things, especially pH, being equal. At equal concentrations of the reagent, e. g. hypochlorites, the effect produced is roughly proportional to the pH.

2. It brings about creaming. The cream is stable and smooth. The extent of creaming depends on the concentration of latex, the quantity of reagent used, and other conditions hereinafter set forth.

3. The stability of the latex is increased as is manifested by the hand rubbing test, that is, it withstands mechanical friction to a greater degree without coagulation. The reagent can be added in any quantity without destroying the stability.

4. The reagent exerts a preservative action on the latex, effectively preventing putrefaction.

5. Small amounts of the reagent act as an effective deodorant.

6. The latex is rendered rapid depositing; i. e. has the property of filterability conferred upon it, to a marked degree.

7. With strongly ammoniacal (.4–1% $NH_3$) latex, a glazed, non-tacky condition is produced in the rubber laid down.

It is seen from the above that a variety of effects are produced. These may occur simultaneously except (1) "tackiness" and (7) glazed surface, which are mutually exclusive, or one or more effects may be produced with the practical exclusion of the others, according to the method by which the process is carried out.

The activity of the hypochlorite solution is increased by increasing the (H)+ i. e. decreasing the pH value. When alkali is present the state of affairs is equivalent to using a less concentrated HClO solution. For this reason, the action of the hypochlorite is more marked in very low $NH_3$ latex, latex which has been maintained on the acid side from the beginning, or latex which has been rendered acid after preservation on the alkaline side, e. g. by the addition of weak acids such as boric, cinnamic, $CO_2$, $CH_2O$ solution, and acid buffer solutions.

The following procedures illustrate the invention:

A.—A sodium hypochlorite solution is prepared from 200 grm. chlorinated lime (available $Cl_2$ approx. 24%), 140 grm. anhydrous $Na_2CO_3$, 1200 cc. $H_2O$. Precipitating material is filtered off.

B.—A solution of lower alkalinity is prepared by adding 40 grm. of boric acid to solution A.

*Example 1.*—To 100 cc. of rubber latex, normal solids content (38%) preserved with .3% of formaldehyde and stabilized with 1.5% of Nekal, 10–20 cc. of solution A are added with stirring. After standing a few hours the latex is seen to become thick, and if it be spread on fabric and air dried around 80° C. the rubber laid down will be found to possess green tack far in excess of that of the same latex not so treated. If not stirred, the consistency of the latex increases and at the same time its filterability is markedly improved. Moderate stirring immediately after the addition of solution A decreases the consistency while effecting increased filterability. After standing overnight the latex creams, a lower layer which constitutes about one third of the whole volume being clear bright serum. In addition, the stability of the latex increases as shown by the hand rubbing test. On further standing (several days) the consistency of the cream increases (mobility decreases) forming a smooth paste which is readily redispersible. If so desired the action of the hypochlorite may be checked by the addition of an antichlor, e. g. sodium thiosulphate or an equivalent in an amount sufficient to react completely with the unchanged hypochlorite. The addition of the sodium thiosulphate also promotes creaming of the latex. For example, if to the latex treated as above 2 to 3 ccs. of 3.6% $Na_2S_2O_3 5H_2O$ solution are added, the clear serum constitutes about one-half of the total volume. If creaming is especially sought after it is preferable to start with latex having less than normal solids content or else to employ a more dilute hypochlorite solution. Moderate stirring in a similar manner, as for bringing about an increase in the rate of deposit, is also favorable to creaming.

*Example 2.*—To 100 cc. of anaerobically decomposed latex of normal solid content (37%) stabilized with Nekal are added 10–30 cc. of solution A. The odor of putrefaction associated with this latex disappears almost immediately. The stability of the latex is improved immediately, considerably more noticeably so than in Example 1, owing to the fact that this latex is more unstable to begin with. After standing overnight, the latex creams, giving a clear serum as before and the rubber from the dried (around 85–90° C.) latex spread on fabric was exceedingly tacky and gave very strong adhesion when two surfaces were pressed together, the effect again greatly exceeding that of the untreated latex. On treating with .1–.3 cc. of the antichlor $Na_2S_2O_3$ solution of the same concentration as in Example 1, the creaming was improved, the clear serum amounting to 50% of the total volume. The increase in tack increased with the amount of solution A, and the degree of creaming was approximately proportional to the quantities of reagents (solution A and Na-thiosulphate) added. The antichlor exerted no noticeable effect upon the "tackiness" of the rubber laid down from the latex. The filterability of the latex was considerably increased.

*Example 3.*—10 to 30 cc. of solution A was added to 100 cc. of latex heat concentrated to 56% T. S. (total solids) and preserved with 0.75% $NH_3$; after standing one half hour 1.0–3 cc. (.036–0.108 grms.) $Na_2S_2O_3$ were added in amounts corresponding to and sufficient to neutralize all of the solution A previously added. The latex was very stable and its consistency increased. After standing overnight, creaming had taken place. The latex when spread on fabric and dried around 85° C. exhibited noticeably less green tack than did the untreated latex. The latex after standing 1 and 2 hours before addition of the antichlor behaved similarly and showed almost complete absence of tack.

*Example 4.*—To 100 cc. of latex (41% of T. S.) preserved with $NH_3$ and the latter reduced to .12% by driving off by means of heat and a current of air, were added 15 cc. of solution A. The latex became slightly more viscous and the filterability was increased. After standing for 3 hours the rubber laid down on fabric showed an increase in green tack. The addition of an equivalent amount of thiosulfate solution, namely 2.85 cc. had no substantial effect on the tack. After standing over 2 months, no putrefaction had taken place in the latex treated with solution A, whereas the untreated latex began to decompose in 3 or 4 days.

*Example 5.*—The latex used in Example 4 was treated with .5 parts of Nekal on 100 rubber (latex solids). To 100 cc. of the latex was added 2.05 cc. of 37% aqueous formaldehyde solution. The latex became immediately a semi-solid mass and very unstable, but on adding 30 cc. of solution A, the latex redispersed, its fluidity and stability returned and a vigorous reaction ensued. The rubber laid down from this latex showed a marked increase in tack. The latex became rapid depositing, increased in consistency, resisted coagulation, and creamed. The same latex treated with solution B gave substantially the same results.

*Example 6.*—The latex used in Example 4 was allowed to commence putrefaction and then treated with solution A. This latex laid down a rubber having much greater green tack than that of the untreated latex and showed appreciably more tack than the treated latex of Example 4. The latex creamed and showed increased stability.

*Example 7.*—Latex as in Example 6 considerably progressed as regards putrefaction was treated with formaldehyde and solution A as in Example 5. The green tack and tendency to cream were more pronounced than was the case in Examples 4 and 5.

*Example 8.*—To 100 cc. of anaerobically decomposed latex were added 2 cc. of commercial sodium hypochlorite solution. This solution is very much weaker than solution A. The odor of putrefaction disappeared. No other noticeable changes are brought about in the latex.

*Example 9.*—100 cc. of creamed latex (62% T. S.), of low ammonia content were treated with 10–30 cc. of solution A as in the previous examples. The rubber therefrom possessed considerably more tack than that of the untreated latex.

*Example 10.*—100 cc. of the latex used in Example 9 were treated with one part of Nekal on 100 parts of rubber, and 2 cc. of 37% CH$_2$O solution thus rendering it acid. On treatment with solution A as in example 9, greater tack was observed than that of the previous example.

The above examples show the different conditions under which the invention can be applied with variations in the results attained.

It is not intended to limit this invention to the use of the particular hypochlorite solution indicated in the illustrative embodiment of the invention. Other hypochlorites or equivalents may be used e. g. those of other alkali metals, alkaline earth hypochlorites, for example calcium hypochlorite

organic hypochlorites, e. g. tertiary butyl, ethyl, amyl.

The latex can be compounded with fillers, oils, pigments, softeners, etc., either before or after treatment with the hypochlorite. Any compounding ingredients which are reacted upon by hypochlorite should, of course, be added after the treatment, and an antichlor employed. The changes brought about by the hypochlorite are favorable to the retention of fillers in suspension in the latex. The latex can be compounded with vulcanizing agents (curatives) and caused to vulcanize, the same precautions being observed here as with the addition of fillers. The hypochlorite treatment can be superimposed on other processes intended to give results such as increased tack, rate of deposition, creaming, etc. In carrying out this invention, it is not intended to limit the quantities of material involved to those quoted in the preceding examples, as the quantities employed in any case will depend on the exact results desired, and the kind and condition of the latex employed.

Having thus described my invention, what I claim and desire to protect by Letters Patent is:

1. The method of treating latex which comprises adding to the latex M—Cl—O, wherein M is alkyl, alkali metal, alkali earth metal or hydrogen.
2. The method of treating latex which comprises adding a hypochlorite thereto.
3. The method of treating latex which comprises adding a salt of hypochlorous acid to a latex of low pH value.
4. The method of treating latex which comprises adding an alkali hypochlorite thereto.
5. The method of treating latex which comprises adding a hypochlorite thereto, and subsquently adding a thiosulphate.
6. The method of treating latex which comprises adding a hypochlorite thereto with stirring, and subsequently adding a thiosulphate.
7. The method of treating latex which comprises adding an alkali hypochlorite thereto with stirring, letting the mixture stand, and reacting upon unchanged hypochlorite with sodium thiosulphate.
8. A mixture of latex M—Cl—O wherein M is alkyl, alkali metal, alkali earth metal or hydrogen.
9. A mixture of latex and a hypochlorite.
10. A mixture of latex and sodium hypochlorite.

Signed at Passaic, county of Passaic, State of New Jersey, this 28th day of September, 1928.

EARDLEY HAZELL.